United States Patent
Srinivasan et al.

(10) Patent No.: US 11,754,723 B2
(45) Date of Patent: Sep. 12, 2023

(54) DYNAMIC RADIO FREQUENCY RECEIVE CHAIN CONTROL

(71) Applicant: QUALCOMM Incorporated, San Diego, CA (US)

(72) Inventors: Deepika Srinivasan, San Jose, CA (US); Krishnaranjan Rao, Sunnyvale, CA (US); Jeffrey Wong, Saratoga, CA (US); Jordan Cookman, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 17/488,424

(22) Filed: Sep. 29, 2021

(65) Prior Publication Data

US 2023/0095394 A1 Mar. 30, 2023

(51) Int. Cl.
*G01S 19/23* (2010.01)
(52) U.S. Cl.
CPC .................... *G01S 19/23* (2013.01)
(58) Field of Classification Search
CPC ........................................................ G01S 19/23
USPC ................................................... 342/357.62
See application file for complete search history.

(56) References Cited

U.S. PATENT DOCUMENTS

| 5,678,169 | A | 10/1997 | Turney |
| 6,016,121 | A | 1/2000 | Bogensberger et al. |
| 8,731,110 | B1* | 5/2014 | Zhou ................. G01S 19/34 375/150 |
| 2010/0149033 | A1* | 6/2010 | Abraham .......... G01S 19/34 342/357.74 |
| 2015/0198718 | A1 | 7/2015 | Khalili et al. |
| 2017/0078978 | A1* | 3/2017 | Scipione .......... H04W 52/18 |
| 2019/0018143 | A1* | 1/2019 | Thayer ............. G01S 17/89 |

FOREIGN PATENT DOCUMENTS

| CN | 105549038 A | * | 5/2016 |
| CN | 209606815 U | * | 11/2019 |
| CN | 110824516 A | | 2/2020 |

OTHER PUBLICATIONS

International Search Report and Written Opinion—PCT/US2022/041879—ISA/EPO—dated Jan. 4, 2023.

* cited by examiner

*Primary Examiner* — Harry K Liu
(74) *Attorney, Agent, or Firm* — Sunstein LLP

(57) ABSTRACT

An apparatus control method includes: controlling a first frequency band receive chain, of an apparatus, to alternate being on and off with a first duty cycle, the first frequency band receive chain being configured to measure satellite signals within a first frequency band; determining one or more performance criteria; and controlling, based on the one or more performance criteria, a second frequency band receive chain, of the apparatus, to alternate being on and off with a second duty cycle, the second frequency band receive chain being configured to measure satellite signals within a second frequency band.

27 Claims, 9 Drawing Sheets

DYNAMIC RADIO FREQUENCY RECEIVE CHAIN CONTROL

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Positions of devices, such as mobile devices, may be determined using terrestrial-based positioning signals and/or satellite positioning signals. Satellite positioning system receivers may be included in various devices for receiving and measuring satellite positioning signals. Measurements of the satellite positioning signals may be processed to determine position information, such as ranges between satellites and the receiver and/or a position estimate for the receiver.

SUMMARY

In an embodiment, a mobile device includes: a memory; a satellite positioning system receiver comprising: a first frequency band receive chain configured to measure satellite signals within a first frequency band; and a second frequency band receive chain configured to measure satellite signals within a second frequency band; and a controller, communicatively coupled to the memory and the satellite positioning system receiver, configured to: control the first frequency band receive chain to alternate being on and off with a first duty cycle; and control the second frequency band receive chain, based on one or more performance criteria, to alternate being on and off with a second duty cycle.

In an embodiment, an apparatus control method includes: controlling a first frequency band receive chain, of an apparatus, to alternate being on and off with a first duty cycle, the first frequency band receive chain being configured to measure satellite signals within a first frequency band; determining one or more performance criteria; and controlling, based on the one or more performance criteria, a second frequency band receive chain, of the apparatus, to alternate being on and off with a second duty cycle, the second frequency band receive chain being configured to measure satellite signals within a second frequency band.

In an embodiment, a mobile device includes: means for measuring satellite signals within a first frequency band; means for measuring satellite signals within a second frequency band; means for controlling the means for measuring satellite signals within the first frequency band to alternate being on and off with a first duty cycle; means for determining one or more performance criteria; and means for controlling, based on the one or more performance criteria, the means for measuring satellite signals within the second frequency band to alternate being on and off with a second duty cycle.

In an embodiment, a non-transitory, processor-readable storage medium includes processor-readable instructions to cause a processor of a mobile device to: control a first frequency band receive chain, of the mobile device, to alternate being on and off with a first duty cycle, the first frequency band receive chain being configured to measure satellite signals within a first frequency band; determine one or more performance criteria; and control, based on the one or more performance criteria, a second frequency band receive chain, of the mobile device, to alternate being on and off with a second duty cycle, the second frequency band receive chain being configured to measure satellite signals within a second frequency band.

DETAILED DESCRIPTION

Figure 1:
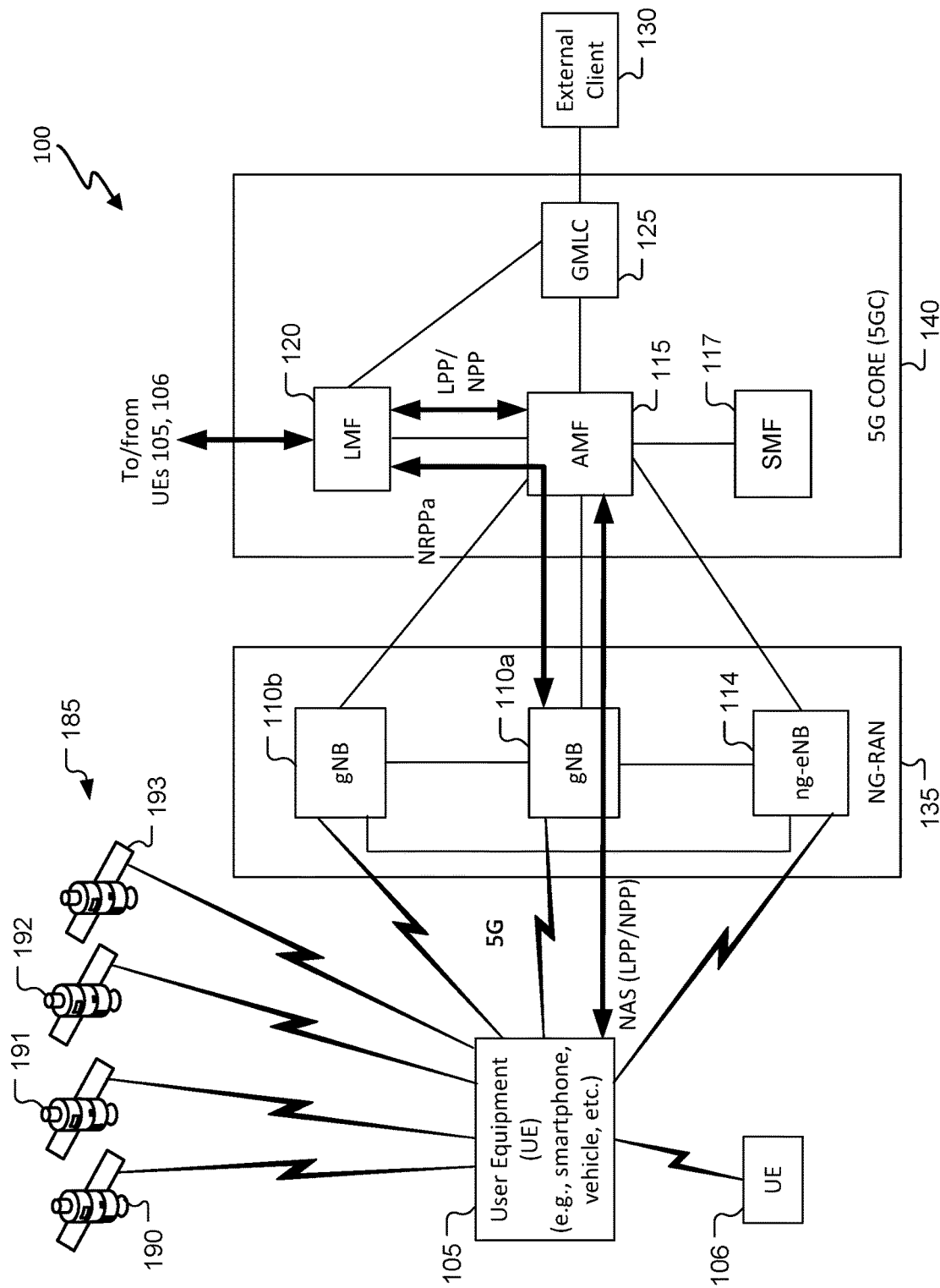
FIG. 1 is a simplified diagram of an example wireless communications system.

Techniques are discussed herein for selectively controlling activation status of one or more components for receiving satellite signals. For example, separate radio frequency (RF) receive chains (e.g., filters, downconverters, correlators, processing components for determining measurements, etc.) may be provided, e.g., for different frequency bands or different frequency sub-bands. One or more of the receive chains may be controlled to be active or inactive (e.g., enabled or disabled), and may have duty cycles (of alternating active and inactive status) controlled based on one or more factors, and the duty cycles of the receive chains may be controlled separately such that the duty cycles may be different. For example, a duty cycle may be controlled based on one or more satellite signal measurement metrics (e.g., measurement residual (relative to a predicted measurement), differential relative to another satellite signal measurement, carrier-to-noise-density ratio, etc.). The duty cycle may also or alternatively depend on a position accuracy based on one or more signal measurements from one or more of the receive chains. For example, a duty cycle may be increased based on less than a desired quantity of signal measurements of good quality from different satellites being obtained. As another example, the duty cycle of a receive chain may be decreased (or even put to 0%, i.e., the receive chain turned OFF) if position accuracy is not improved (or not significantly improved) by using the receive chain (e.g., in addition to one or more other receive chains). As another example, a receive chain for a frequency band that is jammed or in which a spoofed signal is detected may be controlled to be inactive (i.e., OFF). As another example, one or more receive chains may be controlled to be inactive in order to conserve power, e.g., battery power, and/or to conserve resources such as processor instructions (e.g., CPU MIPS (central processing unit million instructions per second)). For example, one or more receive chains may be turned OFF based on a battery level being below a threshold level. These are examples, and other examples (of UEs and/or criteria) may be implemented.

Items and/or techniques described herein may provide one or more of the following capabilities, as well as other capabilities not mentioned. A satellite signal may be acquired while conserving power consumption. Desired positioning accuracy based on satellite signals may be satisfied while conserving power consumption. Power may be saved for tracking a satellite. Processing resources may be conserved, e.g., by avoiding processing of signals of a receive chain. Positioning accuracy degradation due to jamming or spoofing may be avoided while operating in a power-saving mode. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (which may be called a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), the Quasi-Zenith Satellite System (QZSS, also called Michibiki), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110*a*, 110*b*, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110*a*, 110*b* and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more BSs, e.g., one or more of the gNBs 110*a*, 110*b* and/or the ng-eNB 114 may be configured to communicate with the UE 105 via multiple carriers. Each of the gNBs 110*a*, 110*b* and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110*a*, 110*b*, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110*a*, 110*b*, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though may not be connected to the AMF 115 or the LMF 120 in some implementations.

Figure 2:
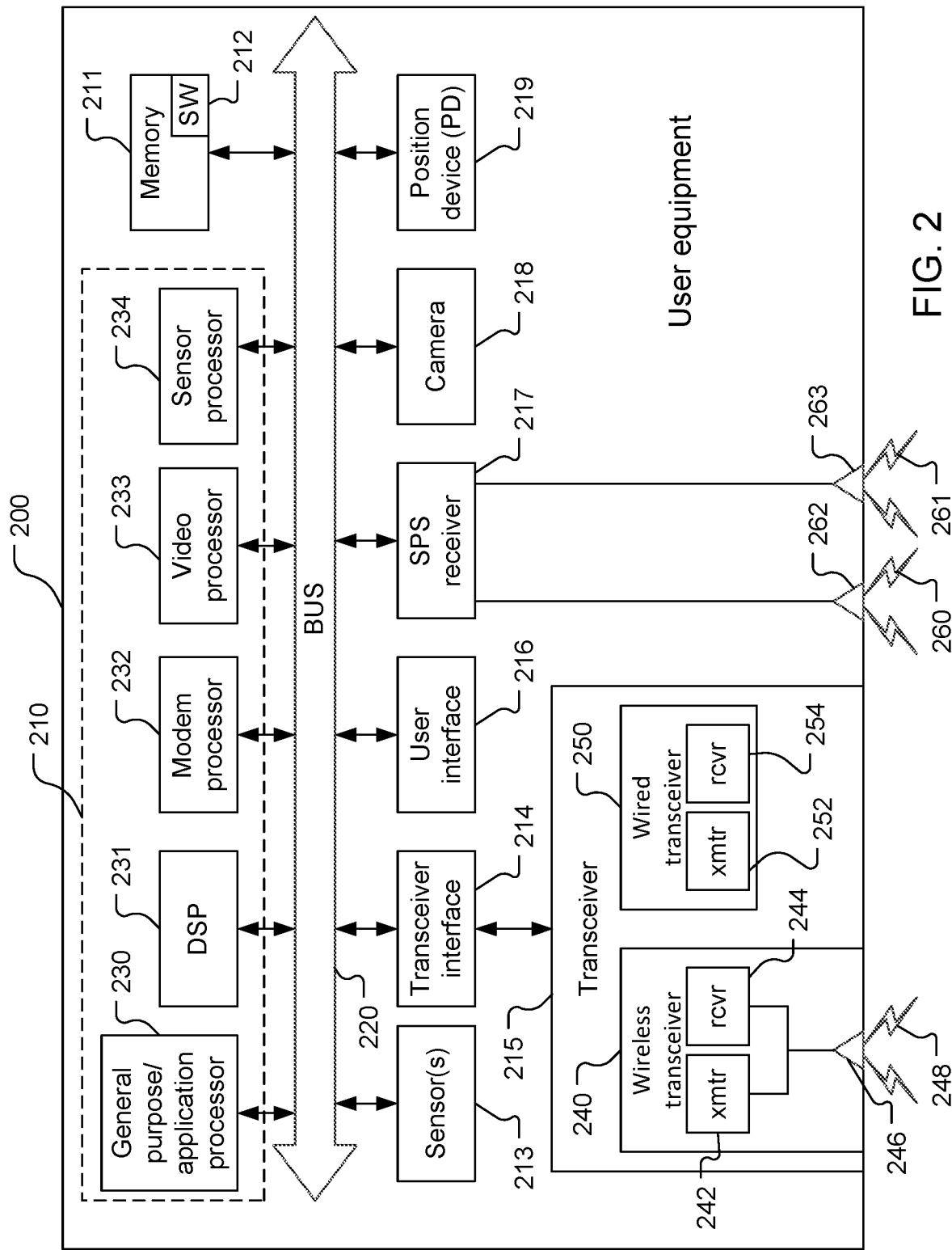
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and/or a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The SPS receiver 217 (e.g., a Global Positioning System (GPS) receiver) may be capable of receiving and acquiring SPS signals 260, 261 via SPS antennas 262, 263, respectively. The antennas 262, 263 are configured to transduce the wireless SPS signals 260, 261, e.g., of different frequencies, to wired signals, e.g., electrical or optical signals, and may be integrated with the antenna 246. The SPS receiver 217 may be configured to process, in whole or in part, the acquired SPS signals 260, 261 for estimating a location of the UE 200. For example, the SPS receiver 217 may be configured to determine location of the UE 200 by trilateration using the SPS signals 260, 261. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260, 261 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, 261, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof Multi-Frequency Band Satellite Signal Processing Multi-frequency GNSS uses satellite signals from different frequency bands to determine desired information such as pseudoranges, position estimates, and/or time. Using multi-frequency GNSS may provide better performance (e.g., position estimate speed and/or accuracy) than single-frequency GNSS for certain qualified conditions. Using multi-frequency GNSS typically uses more power than single-frequency GNSS, e.g., processing power and battery power (e.g., to power a processor (e.g., for determining measurements), baseband processing, and/or RF processing). Techniques discussed herein obtain information using multi-frequency GNSS while using less power than full-time, multi-frequency GNSS. Techniques discussed herein may be able to maintain performance (e.g., position estimation accuracy) similar to full-time, multi-frequency GNSS with reduced power.

Figure 3:
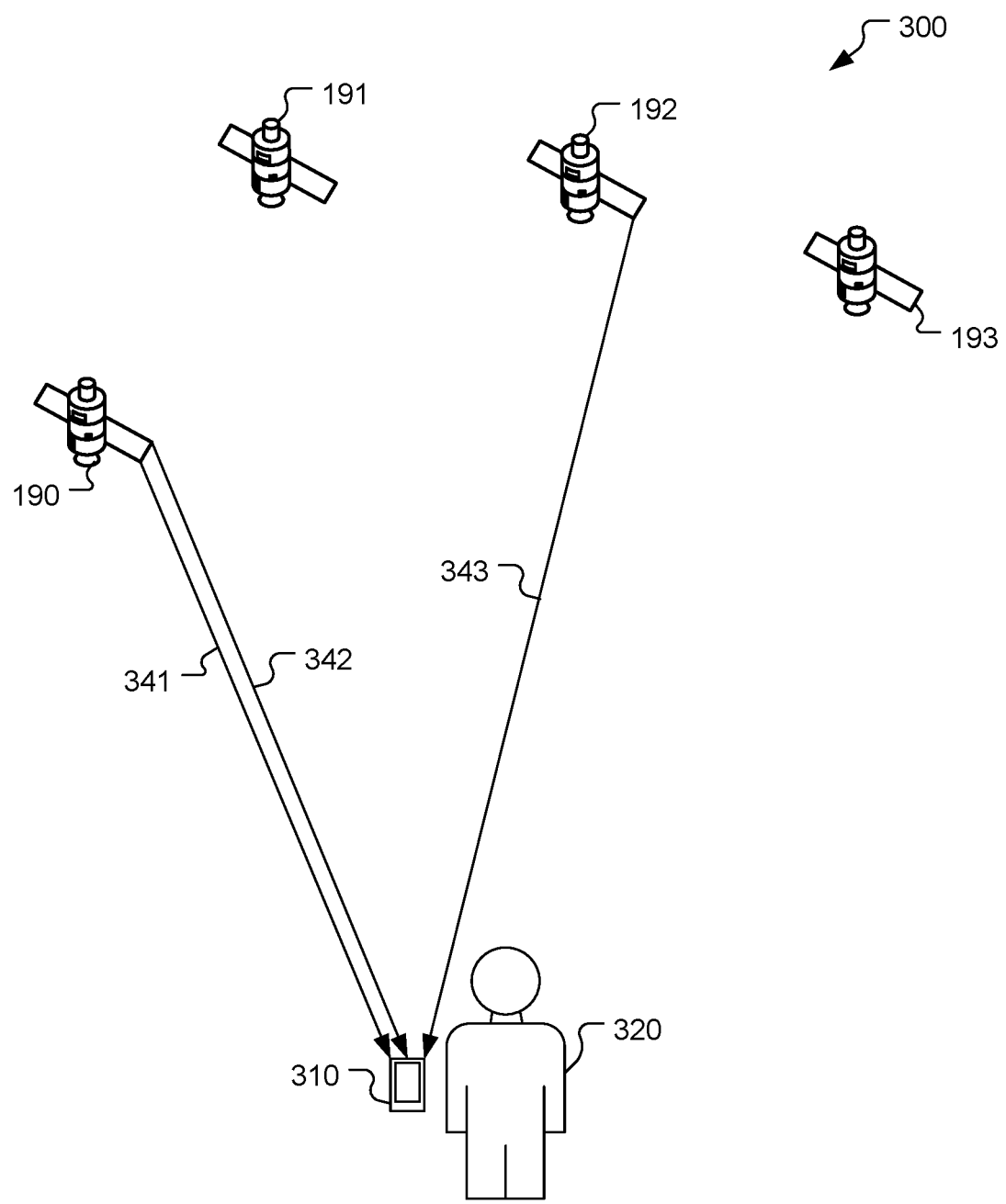
FIG. 3 is a simplified diagram of a navigation environment.

Referring also to FIG. 3, in a navigation environment 300, a UE 310 associated with (e.g., held by) a user 320 may receive satellite signals from the satellites 190-193. The satellites 190-193 may be members of a single satellite constellation, i.e., a group of satellites that are part of a system, e.g., controlled by a common entity such as a government, and orbiting in complementary orbits to facilitate determining positions of entities around the world. Alternatively, the satellites 190-193 may be portions of two or more different satellite constellations, although each of the satellites 190-193 will typically belong to a single satellite constellation. The satellites 190-193 may be, for example, members of the BPS, Galileo, Beidou, GLONASS, or QZSS constellations, respectively. One or more of the satellites 190-193 may transmit multiple satellite signals in different frequency bands, e.g., the satellite 190 may transmit a satellite signal 341 and a satellite signal 342 that have frequencies in different frequency bands, e.g., L1, L2, and L5 frequency bands. The satellites 191 and 193 may transmit signals in the same frequency bands (not shown), and a satellite signal 343 from the satellite 192 may have a frequency in a single frequency band, e.g., the L1 frequency band. The terms L1 band, L2 band, and L5 band are used herein because these terms are used for the GPS SPS to refer to respective ranges of frequencies. Various receiver configurations may be used to receive satellite signals. For example, a receiver may use separate receive chains for different frequency bands. As another example, a receiver may use a common receive chain for multiple frequency bands that are close in frequency, for example L2 and L5 bands. As another example, a receiver may use separate receive chains for different signals in the same band, for example GPS L1 and GLONASS L1 sub-bands. A single receiver may use a combination of two or more of these examples. These configurations are examples, and other configurations are possible.

Multiple satellite bands are allocated to satellite usage. These bands include the L-band, used for GNSS satellite communications, the C-band, used for communications satellites such as television broadcast satellites, the X-band, used by the military and for RADAR applications, and the Ku-band (primarily downlink communication and the Ka-band (primarily uplink communications), the Ku and Ka bands used for communications satellites. The L-band is defined by IEEE as the frequency range from 1 to 2 GHz. The L-Band is utilized by the GNSS satellite constellations such as GPS, Galileo, GLONASS, and BeiDou, and is broken into various bands, including L1, L2, and L5. For location purposes, the L1 band has historically been used by commercial GNSS receivers. However, measuring GNSS signals across more than one band may provide for improved accuracy and availability.

Figure 4:
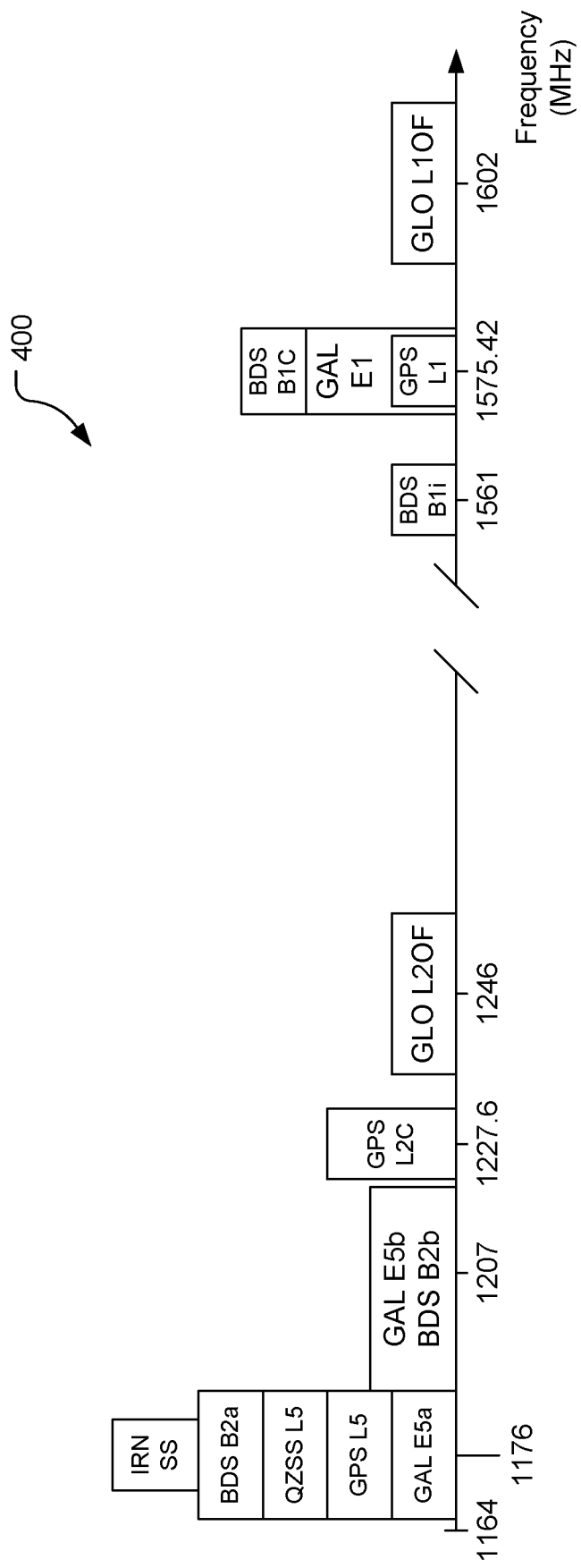
FIG. 4 is a frequency band plot of satellite signals and frequencies of the satellite signals.

Referring also to FIG. 4 (which, like other figures, is not shown to scale), a frequency band plot 400 shows that GNSS constellations operate on several frequencies in the L-Band. The L1 frequency band typically covers frequencies from 1559 MHz to 1606 MHz and includes L1 signals from GPS, Galileo, Beidou, GLONASS, and QZSS GNSS constellations. These same constellations also transmit concurrently using another frequency in the L2 frequency band and/or the L5 frequency band. The L2 and L5 signals may complement the L1 signals, which have been used for many years. For example, the L5 signals have wider signal bandwidth than the L1 signals, which helps improve positioning performance in multi-path environments. Also, using the L5 signals in addition to the L1 signals provides frequency diversity. The L2 and L5 signals are far enough away in frequency from the L1 signals that different processing paths are typically used to measure the L2 and L5 signals versus the L1 signals. While the discussion herein focuses on the L1, L2, and L5 bands, the discussion (including the claims) are not limited to these bands, nor is the discussion limited to the use of satellite signals in two or three bands.

Figure 5:
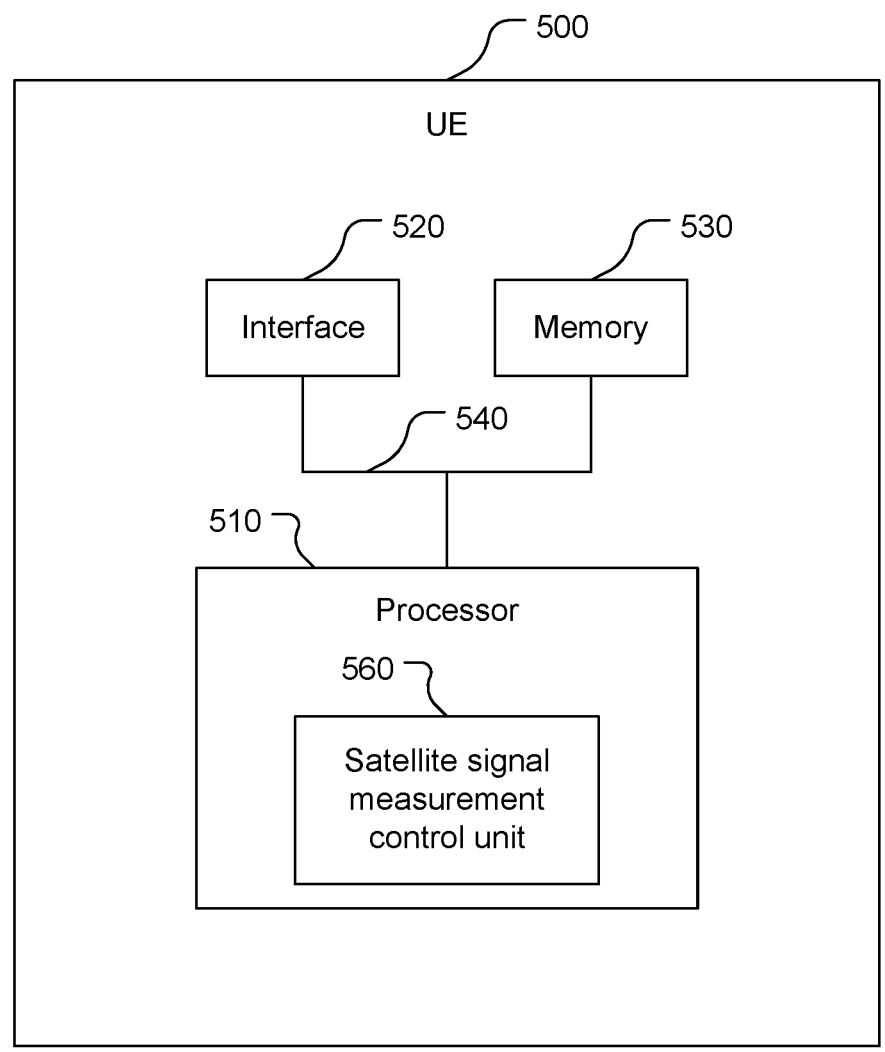
FIG. 5 is a block diagram of an example user equipment.

Referring to FIG. 5, with further reference to FIGS. 1-4, a UE 500 includes a processor 510, an interface 520, and a memory 530 communicatively coupled to each other by a bus 540. The UE 500 may include some or all of the components shown in FIG. 5, and may include one or more other components such as any of those shown in FIG. 2 such that the UE 200 may be an example of the UE 500. The processor 510 may include one or more components of the processor 210. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The interface 520 may include the SPS receiver 217 and the antennas 262, 263 to receive and process satellite signals of different frequencies (e.g., from different frequency bands). The memory 530 may be configured similarly to the memory 211, e.g., including software with processor-readable instructions configured to cause the processor 510 to perform functions.

The description herein may refer only to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520) includes a satellite signal measurement control unit 560. The satellite signal measurement control unit 560 may be configured to perform one or more functions for controlling activation status of receive chains of the UE 500 for measuring one or more satellite signals or disabling measurement of one or more satellite signals. Receive chains may be referred to as RF paths (radio frequency paths).

Figure 6:
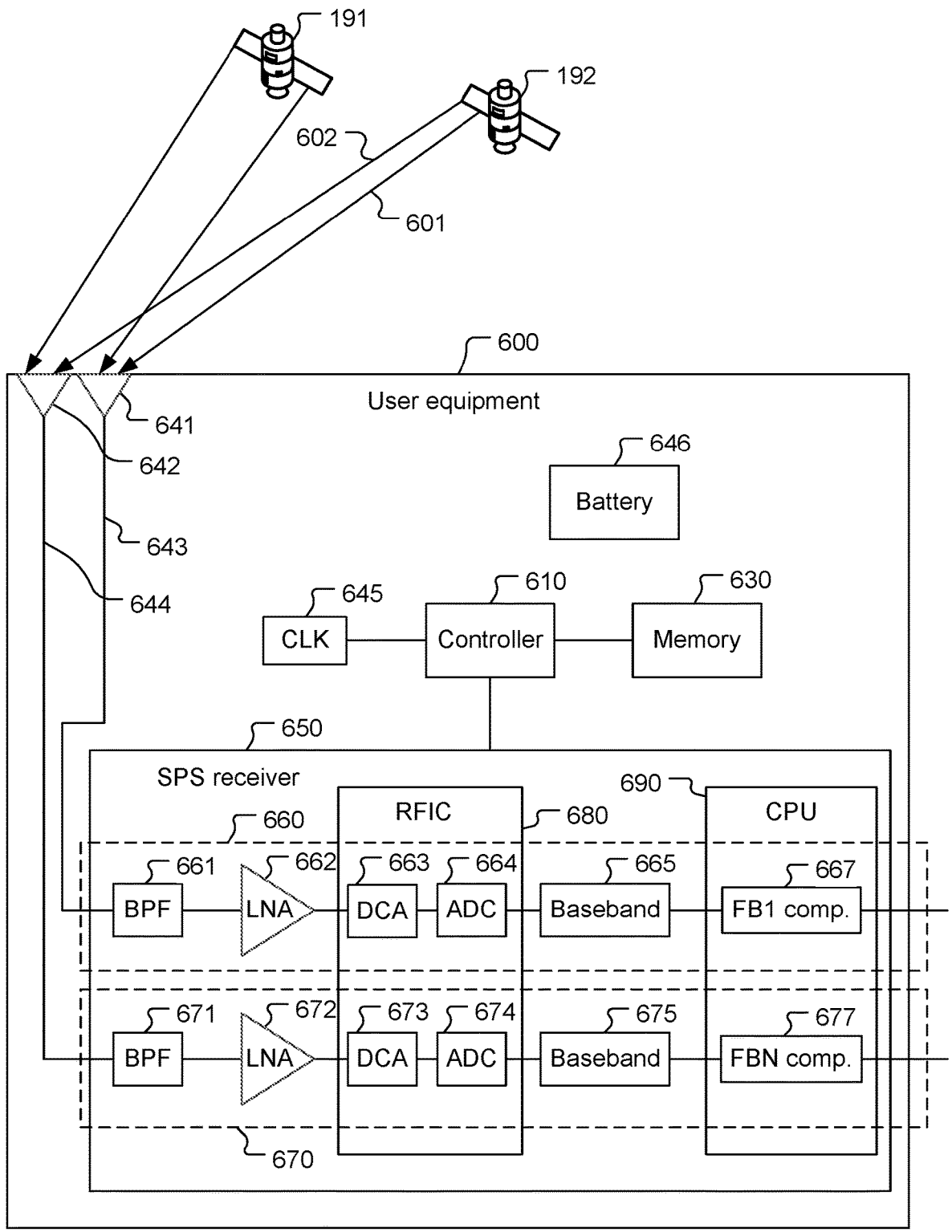
FIG. 6 is a block diagram of an example of the user equipment shown in FIG. 5.

Referring to FIG. 6, with further reference to FIGS. 1-5, a UE 600, which is an example of the UE 500, includes a controller 610, a memory 630, antennas 641, 642, and an SPS receiver 650, and a clock 645 communicatively coupled to each other, and a battery 646 connected to components of the UE 600 that use energy to operate. The controller 610 may be an example of the satellite signal measurement control unit 560 (possibly in combination with the memory 630) and the memory 630 may be an example of the memory 530. The controller 610 may be implemented by the processor 510 and is configured to control components of the SPS receiver 650, e.g., activation status (whether a component (including a portion of a component) is active (e.g., powered or enabled for operation) or inactive (e.g., unpowered or disabled from operation)). The antennas 641, 642 are configured to transduce satellite signals of different frequency bands into electrical signals that are provided to the SPS receiver 650 via respective electrical signal lines 643, 644. The antennas 641, 642 can receive signals of different frequency bands, but may be configured to transduce insufficient amounts of energy of signals for which the antennas 641, 642 are not configured (e.g., designed and built (and possibly tuned)) to transduce.

The SPS receiver 650 includes multiple receive chains 660, 670 for measuring satellite signals of different frequencies. The satellite signals may have frequencies in different but overlapping ranges of frequencies (with one or more shared frequencies), or in separate (non-overlapping) ranges of frequencies (with no shared frequency). The discussion herein refers to the receive chains 660, 670 being for different, non-overlapping frequency bands but this is an example and not limiting of the disclosure, including the claims. Further, while two receive chains are shown in FIG. 6, the UE 600 may include more than two receive chains, e.g., for measuring satellite signals having frequencies in more than two different frequency bands (e.g., different sub-bands). The receive chains 660, 670 may, for example, be configured to measure satellite signals in the L1 and L2/L5 bands, respectively, although this is an example and not limiting of the disclosure as either or both of the receive chains 660, 670 may be configured to measure signals of other frequencies or frequency bands, and/or other receive chains may be included in the UE 600.

The receive chain 660, 670 include respective components for measuring satellite signals, in this example, of different frequency bands, and are connected to different respective antennas, here the antennas 641, 642. The frequency bands corresponding to the receive chains 660, 670 may differ enough such that separate, differently-configured antennas are used to transduce respective satellite signals for the receive chains 660, 670. The receive chain 660 includes the antenna 641, a BPF 661 (bandpass filter), an LNA 662 (low-noise amplifier), a DCA 663 (Digital Controlled Amplifier for down-conversion, signal conditioning/filtering, and amplification), an ADC 664 (analog-to-digital converter), a baseband block 665, and a computational block 667. The BPF 661 is configured to pass signals of frequencies within a desired frequency band, e.g., the L1 band, with little if any attenuation, and to significantly attenuate signals of frequencies outside the desired frequency band of the BPF 661. The LNA 662 is configured to amplify signals passed by the BPF 661. The DCA 663 (which may be called a PGA (programmable gain amplifier)) is configured to down convert the analog amplified signals output by the LNA 662 to a baseband frequency, to perform signal conditioning and/or filtering (e.g., anti-aliasing filtering), and amplification in addition to the amplification by the LNA 662. The ADC 664, which here is a portion of an RFIC 680 (Radio Frequency Integrated Circuit), is configured to convert the analog signals output by the DCA 663 into digital signals. The baseband block 665 is configured to perform intense signal processing of correlating the digital signals output by the ADC 664 with respective reference pseudo-random signals (e.g., Gold codes) by integrating the signals (e.g., for 1 ms) and using the integrated signals for further processing to determine whether the correlation results have sufficient energy to indicate a true signal. The computational block 667, which here is a portion of a CPU 690 (Central Processing Unit), is configured to perform one or more computations on the signals output by the baseband block 665 to determine one or more satellite signal parameters (e.g., pseudorange, $CN_0$ (carrier-to-noise-density ratio, also referred to as C/No), Doppler, carrier phase, etc.). The computational block 667 comprises a portion of the CPU 690 for performing computations for the receive chain 660, namely corresponding to signals in the desired frequency band of the BPF 661. Thus, the computational block 667 is shown as being for computation for frequency band 1 (FB1). The CPU 690 may be a portion of the processor 510. The receive chain 670 includes the antenna 642, a BPF 671, an LNA 672, a DCA 673, an ADC 674, a baseband block 675, and a computational block 677. The BPF 671 is configured to pass signals of frequencies within a desired frequency band, e.g., the L2/L5 band, with little if any attenuation, and to significantly attenuate signals of frequencies outside the desired frequency band of the BPF 671. The LNA 672, DCA 673, ADC 674, baseband block 675, and computational block 677 are configured similarly to the LNA 662, DCA 663, ADC 664, baseband block 665, and computational block 667, but configured, as appropriate, for processing signals corresponding to signals of the desired frequency of the BPF 671. Thus, the computational block 677 is shown as being for computation for frequency band N (FBN), as there may be N receive chains, with N being an integer of two or greater. The antennas 641, 642 are configured to transduce satellite signals of respective frequency bands, and may thus have significantly different configurations.

The receive chains 660, 670 may have respective associated characteristics, e.g., due to different signal characteristics of the signals in the respective frequency bands that the receive chains 660, 670 are configured to measure and/or due to different characteristics of one or more components of the receive chains 660, 670, respectively. For example, the receive chain 670 may have a higher positioning accuracy than the receive chain 660 and the receive chain 660 may have a faster acquisition speed than the receive chain 670 with the receive chain 660 being associated with L1 signals and the receive chain 670 being associated with L5 signals that have a higher bandwidth than the L1 signals.

The receive chains 660, 670 are distinct and may be activated/deactivated independently. Although the DCAs 663, 673 and the ADCs 664, 674 are parts of the RFIC 680, the DCA 663 and the ADC 664 comprise a portion of the RFIC 680 and the DCA 673 and the ADC 674 may comprise a different portion of the RFIC 680, e.g., such that the DCA 663 and the ADC 664 may be enabled/disabled independently of enablement/disablement of the DCA 673 and the ADC 674. Similarly, the computational block 667 comprises a portion of the CPU 690 and the computational block 677 may comprise a different portion of the CPU 690 such that the computational blocks 667, 677 may be enabled/disabled independently. For example, processing by the computational block 667 may be performed while processing by the computational block 677 may be avoided, thus saving power that would be used to perform computations by the computational block 677. Each of the receive chains 660, 670 may be controlled by the controller 610 to be active, e.g., with the BPF 661, the LNA 662, the DCA 663, the ADC 664, the baseband block 665, and the computational block 667 powered by the battery 646 and/or with the BPF 671, the LNA 672, the DCA 673, the ADC 674, the baseband block 675, and the computational block 677 powered by the battery 646. Similarly, each of the receive chains 660, 670 may be controlled by the controller 610 to be inactive, e.g., with one or more of the BPF 661, the LNA 662, the DCA 663, the ADC 664, the baseband block 665, and the computational block 667 not powered or otherwise not used (e.g., the computational block 667 not provided with data to process) and/or with one or more of the BPF 671, the LNA 672, the DCA 673, the ADC 674, the baseband block 675, and the computational block 677 not powered or otherwise not used.

The controller 610 is configured to control the activation status of the receive chain 660, e.g., to be ON, to be OFF, or to alternate between ON and OFF at a first duty cycle, and to control the activation status of the receive chain 670, e.g., to be ON, to be OFF, or to alternate between ON and OFF at a second duty cycle. The duty cycle is typically indicated as a percent P, with the value of the percent P being the percent of time of a cycle (e.g., 1 sec) that the receive chain 660, 670 is ON, 100%—P being the percent of time of the cycle that the receive chain 660, 670 is OFF. Adjusting the duty cycle may be referred to as dynamic power optimization (DPO), even if power usage is not optimized. The receive chain 660 is ON when all components of the receive chain 660 for measuring a received signal are powered. The receive chain 660 is OFF if one or more components of the receive chain 660 is not powered (from the battery 646), thus preventing processing of a satellite signal received from the antenna 641. Similarly, the receive chain 670 is OFF if one or more components of the receive chain 670 is not powered (from the battery 646), thus preventing processing of a satellite signal received from the antenna 642. The controller 610 may control the first duty cycle and the second duty cycle to be the same, possibly synchronized, or may control the duty cycles such that the duty cycles may be different (e.g., the controller 610 may determine the first duty cycle independently of the second duty cycle and/or may cause the receive chains 660, 670 to implement the duty cycles in a way that the duty cycles may differ). The controller 610 may control the duty cycles such that benefits of multi-frequency GNSS operation may be realized while using less power than for full-time multi-frequency GNSS operation.

The controller 610 is configured to control the activation statuses of the receive chains 660, 670 (e.g., ON, OFF, duty cycle) based on one or more of a variety of factors. For example, the controller 610 may control the duty cycles of the SPS receiver 650 in an opportunistic or dynamic way such that duty cycling occurs when signal conditions are favorable such that degradation of GNSS performance will be slight due to duty cycling operation instead of full-time operation. As another example, the efficiency of each of the antennas 641, 642 may be different, e.g., based on present signal conditions, and the controller 610 may determine the duty cycles of the SPS receiver 650 based on the present efficiency of one or more of the antennas 641, 642. For example, satellite signal measurements using the receive chain 660 may be of higher quality than satellite signal measurements using the receive chain 670 under the same conditions, e.g., due to different configurations (e.g., tuning) of the antennas 641, 642 and/or due to different efficiencies of one or more other components of the receive chains 660, 670. The controller 610 may consider factors such as one or more performance criteria of the UE 600 as discussed further herein, e.g., with respect to FIG. 7.

Which of the receive chains 660, 670 (and/or other receive chain) to activate, which of the receive chains 660, 670, if any, to inactivate, and at what duty cycle(s) to activate the receive chains 660, 670 may depend on one or more performance criteria. The one or more performance criteria may include a signal measurement quality metric, e.g., measurement residual, delta between measurements of signals of different frequencies, $CN_0$, etc. Also or alternatively, the one or more performance criteria may include position quality metric (e.g., position estimate accuracy). Activation status of either or both of the receive chains 660, 670 may depend on available power, e.g., battery power level, battery power level in view of power demand, etc.

Figure 7:
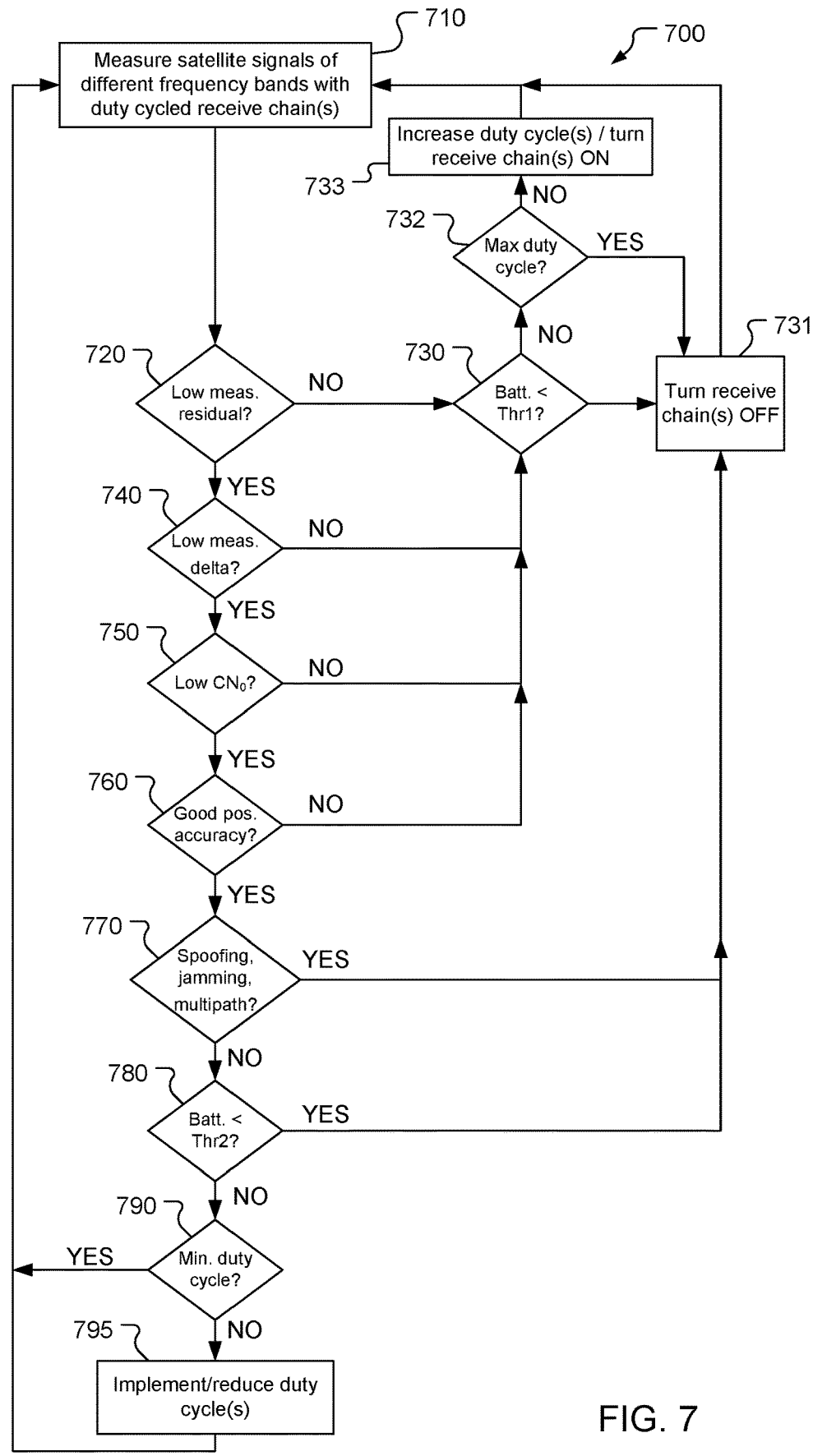
FIG. 7 is a block flow diagram of a satellite signal measurement method.

Referring to FIG. 7, with further reference to FIGS. 1-6, a satellite signal measurement method 700 (e.g., of selective control of multi-frequency GNSS) includes the stages shown. The method 700 is, however, an example only and not limiting. The method 700 may be altered, e.g., by having stages added, removed, rearranged, combined, performed concurrently, and/or having single stages split into multiple stages. For example, one or more of stages 720, 740, 750, 760, 770 may be omitted. Stages 720, 740, 750, 760 may be used to determine whether one or more measured satellite signals meet one or more performance criteria.

At stage 710, the UE 500 receives and measures satellite signals, e.g., of different frequency bands, with one or both of the receive chains being duty cycled (i.e., with a duty cycle less than 100%). For example, the receive chain 660 receives and measures a first satellite signal 601 in a first frequency band (e.g., the L1 band). The antenna 641 receives and transduces the first satellite signal 601 and provides the transduced signal to the BPF 661 and thus the remainder of the receive chain 660. The receive chain 670 receives and measures a second satellite signal 602 in a second frequency band (e.g., the L5 band). The antenna 642 receives and transduces the second satellite signal 602 and provides the transduced signal to the BPF 671 and thus the remainder of the receive chain 670. The controller 610 may cause one or more of the receive chains 660, 670 to be duty cycled in response to a battery level of the battery 646 being below a duty cycle threshold level, or in response to one or more factors discussed below.

At stage 720, the UE 500, e.g., the satellite signal measurement control unit 560 (e.g., the controller 610), determines whether a measurement residual is acceptably low for one or more of the receive chains 660, 670. For example, the controller 610 may determine whether the measurement residual (e.g., a difference between a measurement of the satellite signal 601 and a prediction for the measurement of the satellite signal 601, or a difference between a measurement of the satellite signal 602 and a prediction for the measurement of the satellite signal 602) is below a residual threshold. Different residual thresholds may be used for measurements of the satellite signals 601, 602. If the measurement residual (e.g., for either of the satellite signals 610, 602) is not acceptable, then the method 700 proceeds to stage 730, and proceeds to stage 740 if the measurement residual(s) is(are) acceptable. For stage 720, and/or for either or both of stages 740, 750 discussed below, if there is an insufficient quantity of satellite signal measurements, from a respective quantity of different satellites, meeting the respective measurement metric, then the method 700 proceeds to stage 730. Thus, if there are insufficient satellite signal measurements of good quality made during an active time of a duty cycle of either of the receive chains 660, 670, the method 700 may attempt to increase the respective duty cycle(s) to increase the number of satellites from which satellite signal measurements of good quality are received.

At stage 730, the UE 500 determines whether there is sufficient battery power available to increase the duty cycle(s) of the receive chain(s) 660, 670 for which a duty cycle increase is desired, e.g., corresponding to a performance criterion that is unacceptable. For example, if the stored-energy level (also called simply the level) of the battery 646 is below a threshold for increasing duty cycle, then the method 700 proceeds to stage 731 where the receive chain(s) 660, 670 corresponding to the one or more unacceptable performance criteria is turned OFF (e.g., for a preconfigured amount of time, or until a triggering event (e.g., a change in desired positioning accuracy) occurs to cause the satellite signal measurement control unit 560 to restart the receive chain 660, 670). If the level of the battery is above the threshold for increasing duty cycle, then the method proceeds to stage 732.

At stage 732, the UE 500 determines whether the duty cycle for each of the receive chains 660, 670 corresponding to one or more unacceptable performance criteria is at the respective maximum duty cycle for that receive chain 660, 670. If the duty cycle is below the maximum, then the method 700 proceeds to stage 733. If the duty cycle is at the maximum, then the method 700 proceeds to stage 731. Thus, for example, if measurements of at least a threshold quality (e.g., meeting one or more measurement metric thresholds) of signals from fewer than a threshold quantity of satellites are obtained, then the corresponding receive chain(s) 660, 670 may be turned off at stage 731.

At stage 733, the UE 500, e.g., the satellite signal measurement control unit 560 (e.g., the controller 610), increases one or more of the duty cycles of the receive chains 660, 670 and/or turns one or more of the receive chains 660, 670 fully ON. For example, the controller 610 may increase the duty cycle(s) of the receive chain(s) 660, 670, whose measurement residual exceeds a threshold, with a respective measurement residual (i.e., a difference between a satellite signal measurement and a prediction of the satellite signal measurement) above a respective measurement residual threshold. The duty cycle may be increased by a fixed amount, e.g., 10%, or may be increased by an amount corresponding to the amount that the measurement residual exceeds the measurement residual threshold (e.g., the greater residual, the more the duty cycle is increased). Different fixed or variable amounts of duty cycle increase may be applied to the receive chains 660, 670, respectively. The duty cycle of one of the receive chains 660, 670 may be increased without increasing the duty cycle of the other receive chain 660, 670. The duty cycle may be increased up to a maximum duty cycle, e.g., 100% at which point the receive chain 660, 670 is fully ON (although a maximum duty cycle of less than 100% may be used). At stage 733, one or more of the receive chains 660, 670 may be turned fully ON without first increasing a duty cycle (or implementing a duty cycle for a receive chain that was OFF), e.g., if the measurement residual threshold discussed above is a first measurement residual threshold and the residual exceeds a second measurement residual threshold that is higher than the first measurement residual threshold. If duty cycles of the receive chains 660, 670 are at maximums (e.g., both receive chains 660, 670 fully ON), and the one or more performance criteria (e.g., as determined by stage 720, 740, 750, or 760) are still not met, then one or more of the receive chains 660, 670 may be turned OFF, at least temporarily. For example, if the one or more performance criteria are not significantly improved by having the receive chain 670 ON, then the receive chain 670 may be turned OFF, which conserves power without significantly affecting performance (e.g., position estimate accuracy). The receive chain 660, 670 that has been turned OFF may be reactivated by the controller 610 intermittently (e.g., periodically based on a timer, aperiodically in response to a request, semi-persistently (periodically in response to an aperiodic request), etc.) in order to determine new measurements. A periodicity of reactivation of a deactivated receive chain may depend on implementation and/or one or more desired uses of the measurement(s) and/or one or more conditions (e.g., for determining atmospheric delay, conditions such as time of day, sunspot activity, how the SPS receiver 650 reacts to atmospheric delay, etc.). The controller 610 may, for example, reactivate a deactivated receive chain every few hours (e.g., every 6-8 hours) or more frequently, e.g., every 10 minutes or even more often. After stage 733, the method 700 returns to stage 710.

At stage 740, the UE 500 determines whether one or more differences (deltas) between measurements made by the receive chains 660, 670 is(are) acceptably low. For example, the controller 610 may determine whether values of $CN_0$ measured by the receive chains 660, 670 are within a threshold $CN_0$ difference of each other. As another example, the controller 610 may determine whether times of arrival of the satellite signals 601, 602 (from the same satellite, here the satellite 192) are within a threshold time difference (e.g., based on a known digital delay for processing the satellite signals 601, 602 in the receive chains 660, 670). The controller 610 may determine whether a combination of measurements is below a combined threshold, e.g., a weighted combination of differences is below a measurement combination threshold in order to proceed to stage 750. If the one or more measurement differences is(are) acceptably low, then the method 700 proceeds to stage 750. If the one or more measurement differences is(are) not acceptably low (the measurements are not acceptably close to each other), then one or more of the received satellite signals may be subject to multipath and the method 700 proceeds to stage 730, and possibly to stage 733 (depending on the inquiry at stage 730 and, if stage 732 is reached, the inquiry at stage 732) where the duty cycle(s) is(are) increased, e.g., by a fixed amount (which may be different amounts for the receive chains 660, 670, respectively) or by one or more amounts proportional to the excess of the difference(s) relative to the threshold(s). The duty cycle of one of the receive chains 660, 670 may be increased due to the measurement delta exceeding a threshold without increasing the duty cycle of the other receive chain 660, 670.

At stage 750, the UE 500, e.g., the satellite signal measurement control unit 560 (e.g., the controller 610), determines whether a measured carrier-to-noise-density ratio ($CN_0$) is acceptably low for one or more of the receive chains 660, 670. For example, the controller 610 may determine whether the $CN_0$ measured by the receive chain 660 and/or the $CN_0$ measured by the receive chain 670 is below a respective $CN_0$ threshold. If both of the $CN_0$ measurements are below respective thresholds, then the method 700 proceeds to stage 760. If one or more of the $CN_0$ measurements are above a respective threshold, then the method 700 proceeds to stage 730, and possibly to stage 733 where the duty cycle of the receive chain(s) whose $CN_0$ measurements are above a respective threshold is increased.

At stage 760, the UE 500, e.g., the satellite signal measurement control unit 560 (e.g., the controller 610), determines whether a determined position estimate, based on measurements from one or more of the receive chains 660, 670 is acceptably accurate. For example, the controller 610 may determine a position estimate using measurements from the receive chain 660, measurements from the receive chain 670, and/or from a combination of one or more measurements from the receive chain 660 and one or more measurements from the receive chain 670. The controller may determine a 3D position sigma ($\sigma$) indicative of error of any determined position estimate. If the error is below a threshold error (e.g., 5m or 3m), then the method 700 proceeds to stage 770. If the error exceeds the threshold error (has grown over time and now exceeds the threshold error), then the method 700 proceeds to stage 730, and possibly to stage 733 where the duty cycle is increased for any of the receive chains 660, 670 corresponding to a position error over a respective threshold error.

At stage 770, the UE 500, e.g., the controller 610 of the UE 600, determines whether one or more satellite signals are being spoofed, whether signal jamming is present, and/or whether one or more of the satellite signals 601, 602 is multipath. During satellite signal acquisition and/or tracking and based on present environmental conditions, one or more satellite signals may be intentionally or unintentionally jammed. A signal may be intentionally jammed, for example, by a device configured and disposed to simulate a satellite. A satellite signal may be unintentionally jammed by a signal transmitted for a purpose other than jamming a satellite signal but that overlaps in frequency with the satellite signal and is of enough power when received to interfere with measurement (e.g., impede accurate measurement) of the satellite signal. The UE 600 may jam signals by transmitting a signal that is received by the UE 600 and interferes with (e.g., overwhelms) a received satellite signal. The UE 500 may detect presence of a jamming signal (e.g., using a known technique employing decimation and/or frequency translation). The UE 500 may determine whether a measured signal is spoofed or multipath using one or more respective known techniques. If the UE 500 determines that a measured signal is spoofed or multipath, or that jamming is present (in one or both of the frequency bands of the receive chains 660, 670), then the method 700 proceeds to stage 731 where the receive chain(s) corresponding to the spoofed signal, jamming, or the multipath signal is turned OFF. The receive chain(s) 660, 670 may be turned back on periodically to determine whether the spoofing, jamming, or multipath condition still exists. If the UE 500 determines that no spoofing, jamming, or multipath condition exists (or does not determine that a spoofing, jamming, or multipath condition does exist), then the method 700 proceeds to stage 780.

At stage 780, the UE 500 determines whether there is sufficient battery power available to continue powering one or more of the receive chains 660, 670. For example, if the battery level is below a threshold amount corresponding to minimum duty cycles for the receive chains 660, 670, then the method 700 may proceed to stage 731 where one or both of the receive chains 660, 670 is turned OFF. For example, one of the receive chains 660, 670 may continue to be powered while the other receive chain 660, 670 is powered OFF if the battery level is below the threshold evaluated at stage 780 but above another battery level threshold for powering one of the receive chains 660, 670 (e.g., at a minimum duty cycle). If, at stage 780, the battery level is not below the threshold amount, then the method 700 proceeds to stage 790.

At stage 790, the UE determines whether the receive chains 660, 670 are at respective minimum duty cycles (which may be the same value). If the duty cycles of the receive chains 660, 670 are at their minimum values (if any) without being turned OFF (i.e., 0% duty cycle), then the method 700 returns to stage 710. A minimum duty cycle may be determined based, for example, on an amount of time typically used to measure a satellite signal. Examples of minimum duty cycles are 50% or 30%, although other minimum duty cycles may be used. If the receive chains 660, 670, or at least the receive chain 660, 670 for which the duty cycle is desired to be reduced, is not at the minimum value, then the method 700 proceeds to stage 795 where the respective duty cycle(s) is(are) implemented or reduced. A duty cycle (of less than 100%) may be implemented (e.g., introduced) where a receive chain 660, 670 has been fully on in order to reduce power used. A duty cycle may be reduced by a fixed amount (e.g., 5%, 10%, etc.) each time a reduction is desired, or may be reduced by a variable amount, e.g., an amount based on how well the one or more performance criteria are met (e.g., how good a positioning accuracy is, how low a residual is, how much affect the receive chain measurement(s) affect position accuracy, etc., or a combination thereof). Optionally at stage 795, a duty cycle may not be reduced until after passage of a minimum amount of time since a most recent increase in the duty cycle. This provides some hysteresis to avoid increasing a duty cycle enough to meet one or more performance criteria and then, after a single subsequent performance of the method 700, decreasing the duty cycle which may result in the one or more performance criteria no longer being met.

While one or more of the receive chains 660, 670 are OFF (e.g., as part of a duty cycle or for a longer time, e.g., per stage 731), the clock 645 is still powered. In this way, a Kalman filter can continue to predict satellite signal measurement values and position estimates that may be used at stages 720, 760, respectively, to determine whether an increase in duty cycle is desired.

The UE 500 may control the duty cycle(s) of the receive chain(s) 660, 670 for a variety of purposes. For example, the controller 610 may control the activation status of both of the receive chains 660, 670 to be active in order to determine atmospheric delay (e.g., ionospheric delay). For example, in response to a request (e.g., from an application) to determine atmospheric delay, the controller 610 may cause both of the receive chains 660, 670 to be active, e.g., with at least minimum duty cycles. Having both of the receive chains 660, 670 be active will help the UE 600 determine atmospheric delay, and knowing the atmospheric delay may help improve positioning accuracy. Because ionospheric delay changes slowly, once ionospheric delay is determined, if steady-state operation (e.g., satellite tracking) with acceptable quality of service may proceed without both of the receive chains 660, 670 active, e.g., with one of the receive chains inactive or with a reduced duty cycle (e.g., a receive chain for the L5 band). This may help save power while maintaining performance, e.g., satellite tracking, positioning accuracy.

Figure 8:
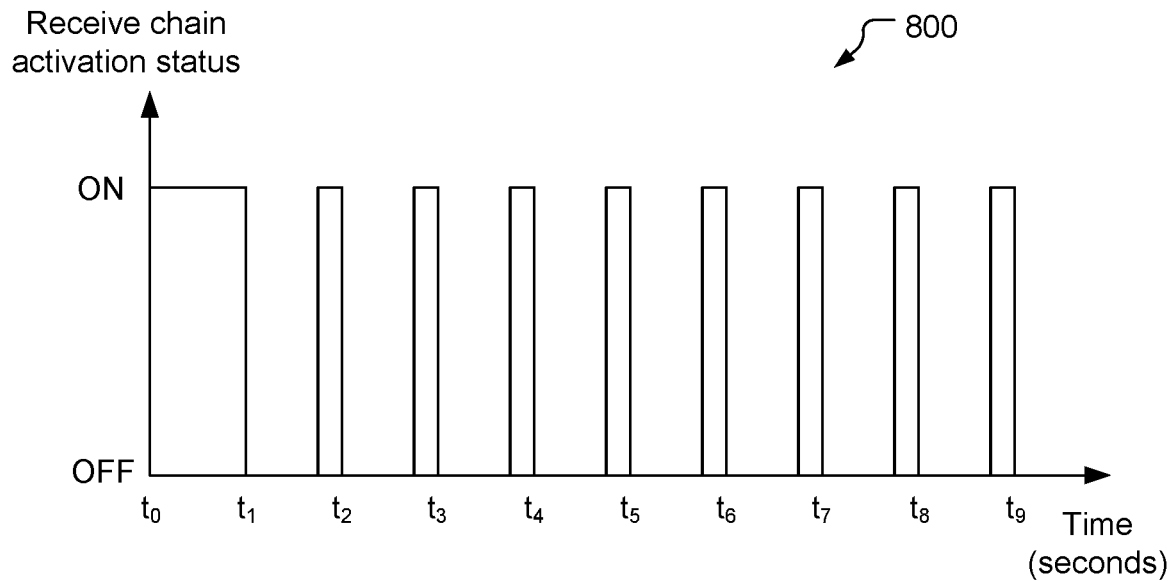
FIG. 8 is a timing diagram of a receive chain activation status.
Figure 9:
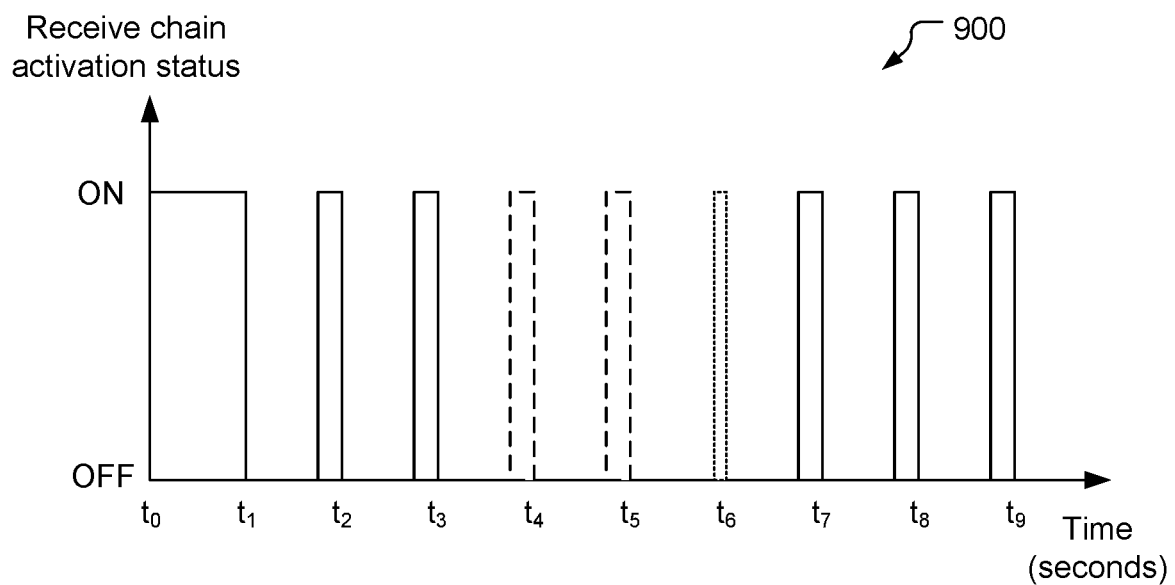
FIG. 9 is another timing diagram of a receive chain activation status.

The UE 500, e.g., the satellite signal measurement control unit 560, may control the duty cycles of receive chains for various reasons and/or to have various duty cycles over time. For example, referring also to FIGS. 8 and 9, different example combinations of duty cycles for the receive chains 660, 670 are shown. In a receive chain activation status timeline 800 shown in FIG. 8, the receive chains 660, 670, when duty cycled, have the same example a duty cycle frequency of 1 Hz (i.e., times between consecutive time marks, e.g., from a time $t_0$ to a time $t_1$, is one second). In the example timeline 800, from a time $t_0$ to a time $t_1$, the controller 610 controls the receive chains 660, 670 to both be at 100% duty cycle, i.e., continuously ON. Between times $t_1$ and $t_9$, the controller 610 controls both of the receive chains 660, 670 to have a 25% duty cycle, with both duty cycles being synchronized. In a receive chain activation status timeline 900 shown in FIG. 9, from a time $t_0$ to a time $t_1$, the controller 610 controls the receive chains 660, 670 to both be at 100% duty cycle. Between times $t_1$ and $t_3$, the controller 610 controls the receive chains 660, 670 to both be at 25% duty cycle. Between times $t_3$ and $t_5$, the controller 610 controls the receive chain 660 to have a 25% duty cycle, and the receive chain 670 to be OFF. Between times $t_3$ and $t_5$, the controller 610 controls the receive chain 670 to have a 12.5% duty cycle, and the receive chain 660 to be OFF. Between times $t_6$ and $t_9$, the controller 610 again controls both the receive chains 660, 670 to have a 25% duty cycle. As illustrated, the controller 610 may control the duty cycles of the receive chains 660, 670 such that the duty cycles are the same and synchronized, such that the duty cycles are different, or such that the duty cycles are not overlapping. Although not illustrated in FIGS. 8 and 9, other configurations of duty cycles and relative duty cycles may be implemented by the controller 610. For example, the duty cycles of the receive chains 660, 670 may overlap in time but be different (have different values, e.g., 25% and 50%). As another example, the duty cycles may be the same but not overlap in time (e.g., both be 50% but have the receive chain 660 be OFF while the receive chain 670 is duty cycled (is alternating between being ON and OFF) and vice versa). As another example, the controller 610 may be configured to determine the duty cycles of the receive chains 660, 670 independently (e.g., not using any common factors) or to determine the duty cycles using one or more common factors and one or more other factors such that the determined duty cycle values may be different. Still other example implementations may be used. Using different duty cycle values may help reduce power consumption (e.g., as much as possible) while still meeting one or more performance criteria (e.g., position estimation accuracy).

The duty cycles of the receive chains 660, 670 may have respective minimum values. For example, the receive chains 660, 670 may have minimum duty cycle values of 30%, or 50%, or another value. The minimum duty cycle value(s) may be set (e.g., stored in the memory 630 during manufacture, or determined during use of the UE 600) to help ensure that measurements will meet one or more criteria (e.g., measurement quality).

Figure 10:
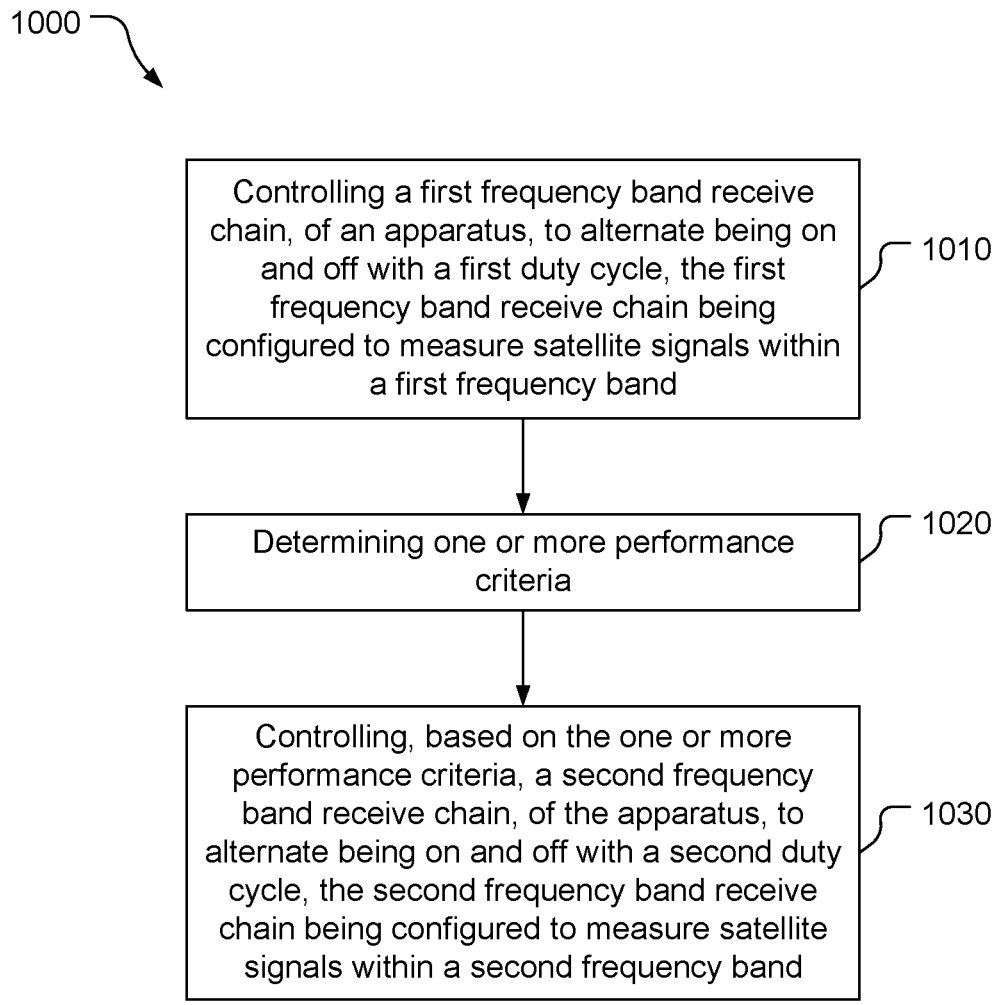
FIG. 10 is a block diagram of an apparatus control method.

Referring to FIG. 10, with further reference to FIGS. 1-9, an apparatus control method 1000 includes the stages shown. The method 1000 is, however, an example only and not limiting. The method 1000 may be altered, e.g., by having stages added, removed, rearranged, combined, performed concurrently, and/or having single stages split into multiple stages. Examples are provided below for receiving L1 and L5 signals, but the disclosure is not limited to these frequency bands and is not limited to receiving (or measuring) two satellite signals (also called SV signals).

At stage 1010, the method 1000 includes controlling a first frequency band receive chain, of an apparatus, to alternate being on and off with a first duty cycle, the first frequency band receive chain being configured to measure satellite signals within a first frequency band. For example, the satellite signal measurement control unit 560 controls a duty cycle of a portion of the interface 520. For example, the controller 610 controls the duty cycle of the receive chain 660. The processor 510 (possibly in combination with the memory 530) or the controller 610 (possibly in combination with the memory 630) may comprise means for controlling the first frequency band receive chain or means for controlling means for measuring satellite signals within the first frequency band.

At stage 1020, the method 1000 includes determining one or more performance criteria. For example, the satellite signal measurement control unit 560 (e.g., the controller 610) determines one or more quality metrics, position accuracy, etc. The controller 610 may determine the one or more performance criteria by obtaining one or more measurements from the computational block 667 and/or the computational block 677, and possibly processing the one or more measurements (e.g., to determine a quality metric). The processor 510 (possibly in combination with the memory 530) or the controller 610 (possibly in combination with the memory 630 and/or one or more of the receive chains 660, 670 or one or more portions thereof (e.g., one or more of the computational blocks 667, 677)) may comprise means for determining the one or more performance criteria.

At stage 1030, the method 1000 includes controlling, based on the one or more performance criteria, a second frequency band receive chain, of the apparatus, to alternate being on and off with a second duty cycle, the second frequency band receive chain being configured to measure satellite signals within the second frequency band. For example, the satellite signal measurement control unit 560 controls a duty cycle of a portion of the interface 520 based on the one or more performance criteria, e.g., increasing one or more duty cycles if the one or more performance criteria do not meet one or more desired standards or decreasing one or more duty cycles if the one or more performance criteria meet the one or more desired standards. For example, the controller 610 controls the duty cycle of the receive chain 670, e.g., in accordance with the method 700. This may help the UE 500 or the UE 600 meet one or more desired performance characteristics (e.g., acquire satellite signals, determine position estimates with desired accuracy, track satellites, etc.) while conserving power relative to having receive chains for different frequency bands always on. The first frequency band may be different from the second frequency band (e.g., with the first and second frequency bands being different frequency bands or a different frequency sub-bands). The processor 510 (possibly in combination with the memory 530) or the controller 610 (possibly in combination with the memory 630) may comprise means for controlling the second frequency band receive chain or means for controlling means for measuring satellite signals within the second frequency band.

Implementations of the method 1000 may include one or more of the following features. In an example implementation, the one or more performance criteria comprise a satellite signal measurement quality metric. The satellite signal measurement quality metric may be a single signal measurement metric (e.g., RSRP) or a combination of signal measurement metrics (e.g., a sum or average of multiple normalized measurement metrics (e.g., RSRP, $CN_0$), or multiple measurement metrics each meeting a respective threshold). In a further example implementation, controlling the second frequency band receive chain comprises increasing the second duty cycle in response to the second frequency band receive chain measuring fewer than a threshold quantity of satellite signals, each corresponding to a different satellite, that each have a value of the satellite signal measurement quality metric of at least a threshold value. For example, if enough strong satellite signals are not received to determine a position estimate of the UE with a desired accuracy, then the satellite signal measurement control unit 560 (or the controller 610) may increase a duty cycle of a portion of the interface 520 (e.g., the receive chain 670). This may help balance conserving power used and meeting the desired performance characteristic(s). In another further example implementation, the satellite signal measurement quality metric comprises a difference between a measurement, by the second frequency band receive chain, of a satellite signal and a predicted measurement of the satellite signal. For example, the satellite signal measurement control unit 560 (e.g., the controller 610) may determine a residual of an actual measurement and a predicted measurement value (e.g., predicted by a Kalman filter) as discussed with respect to stage 720. In another further example implementation, the satellite signal measurement quality metric comprises a difference between a first measurement, of a first satellite signal by the first frequency band receive chain, and a second measurement of a second satellite signal by the second frequency band receive chain. For example, as discussed with respect to stage 740, the satellite signal measurement control unit 560 (e.g., the controller 610) may determine one or more differences between similar satellite signal measurements (e.g., times of arrival, $CN_0$) for satellite signals of different frequency bands (e.g., the satellite signals 601, 602) and use this(these) difference(s) to control the duty cycle of the second satellite signal receive chain (e.g., the receive chain 670). In another further example implementation, the satellite signal measurement quality metric comprises a carrier-to-noise-density ratio. For example, as discussed with respect to stage 740, the satellite signal measurement control unit 560 (e.g., the controller 610) may determine whether one or more carrier-to-noise-density ratios is(are) below the desired level(s).

Also or alternatively, implementations of the method 1000 may include one or more of the following features. In an example implementation, the one or more performance criteria comprise a position quality metric corresponding to a measurement of a satellite signal by the second frequency band receive chain. For example, as discussed with respect to stage 740, the satellite signal measurement control unit 560 (e.g., the controller 610) may determine whether one or more signal measurements from the receive chain 670 (and possibly the receive chain 660) yield a position accuracy (an accuracy of a position estimate for the UE 500 (UE 600)) that is within a threshold accuracy. In another example implementation, the first duty cycle is controlled independently of the second duty cycle. For example, the satellite signal measurement control unit 560 (e.g., the controller 610) may determine the duty cycles of the receive chains 660, 670 in such a way that the duty cycles may be different. This may help balance performance and power consumption by customizing amounts of power used by each of the receive chains 660, 670. The satellite signal measurement control unit 560 (e.g., the controller 610) may determine the duty cycles completely separately, or by using one or more overlapping factors and/or operations. In a further example implementation, the second duty cycle is controlled to have a longer on time than the first duty cycle. For example, the satellite signal measurement control unit 560 (e.g., the controller 610) may set the ON and OFF times of the receive chain 670 such that the ON time of the receive chain 670 is longer than the ON time of the receive chain 660 (whether or not the cycle time (i.e., the sum of one ON time and one OFF time) of the duty cycles of both of the receive chains 660, 670 span the same amount of time). Having the ON time of the receive chain 670 (e.g., for the L5 band) be longer than the ON time of the receive chain 660 (e.g., the L1 band) may help a signal be measured by a receive chain that may not be able to measure the signal as well as another receive chain can measure another signal if both receive chains use the same amount of ON time.

Also or alternatively, implementations of the method 1000 may include one or more of the following features. In an example implementation, the method 1000 includes turning off the second frequency band receive chain based on fewer than a threshold number of satellite signal measurements, by the second frequency band receive chain and each corresponding to a different satellite, meeting a threshold measurement metric value. For example, if quality signal measurements are not obtained by the receive chain 670 for signals from a sufficient number of satellites, then the receive chain 670 may be turned off, thereby conserving power. In another example implementation, the method 1000 includes turning off the second frequency band receive chain based on at least one of an energy storage level of a battery of the apparatus being below a threshold energy storage level, detection of a spoofed signal in the second frequency band, or detection of jamming in the second frequency band. For example, as discussed with respect to stages 730, 770, 780, if the level of the battery 646 is too low to support desired operation (e.g., duty cycle increase to meet performance criteria, support for even minimum duty cycle of one or more of the receive chains 660, 670), or signal jamming or signal spoofing (or a multipath condition) is detected, then the affected receive chain(s) 660, 670 may be turned off to avoid wasting power on operations that are of lower priority than other operations, and/or that will not help improve performance, e.g., position estimation accuracy, satellite tracking, etc.

Also or alternatively, implementations of the method 1000 may include one or more of the following features. In an example implementation, the method 1000 includes receiving a first satellite signal, that has a frequency in the first frequency band, by a first satellite signal receive chain of the apparatus. For example, The UE 500, e.g., the interface 520, and possibly the processor 510, receives a satellite signal. For example, the receive chain 660 (including the antenna 641) of the UE 600 receives the satellite signal 601. The satellite signal 601 has a first frequency in a first frequency band (e.g., the L1 band) and the receive chain 660 is configured to receive and measure signals in the first frequency band. The interface 520 (and possibly the processor 510) or the receive chain 660 may comprise means for measuring satellite signals within the first frequency band. In another example implementation, the method 1000 includes receiving a second satellite signal, that has a frequency in the second frequency band, by a second satellite signal receive chain of the apparatus. For example, The UE 500, e.g., the interface 520, and possibly the processor 510, receives a satellite signal. For example, the receive chain 670 (including the antenna 642) of the UE 600 receives the satellite signal 602. The satellite signal 602 has a second frequency in a second frequency band (e.g., the L5 band) and the receive chain 670 is configured to receive and measure signals in the second frequency band. The interface 520 (and possibly the processor 510) or receive chain 670 may comprise means for measuring satellite signals within the second frequency band.

Implementation Examples

Implementation examples are provided in the following numbered clauses.

Clause 1. A mobile device comprising:
a memory;
a satellite positioning system receiver comprising:
a first frequency band receive chain configured to measure satellite signals within a first frequency band; and
a second frequency band receive chain configured to measure satellite signals within a second frequency band; and
a controller, communicatively coupled to the memory and the satellite positioning system receiver, configured to:
control the first frequency band receive chain to alternate being on and off with a first duty cycle; and
control the second frequency band receive chain, based on one or more performance criteria, to alternate being on and off with a second duty cycle.

Clause 2. The mobile device of clause 1, wherein the one or more performance criteria comprise a satellite signal measurement quality metric.

Clause 3. The mobile device of clause 2, wherein the controller is configured to control the second frequency band receive chain to increase the second duty cycle in response to the second frequency band receive chain measuring fewer than a threshold quantity of satellite signals, each corresponding to a different satellite, that each have a value of the satellite signal measurement quality metric of at least a threshold value.

Clause 4. The mobile device of clause 2, wherein the satellite signal measurement quality metric comprises a difference between a measurement, by the second frequency band receive chain, of a satellite signal and a predicted measurement of the satellite signal.

Clause 5. The mobile device of clause 2, wherein the satellite signal measurement quality metric comprises a difference between a first measurement, of a first satellite signal by the first frequency band receive chain, and a second measurement of a second satellite signal by the second frequency band receive chain.

Clause 6. The mobile device of clause 2, wherein the satellite signal measurement quality metric comprises a carrier-to-noise-density ratio.

Clause 7. The mobile device of clause 1, wherein the one or more performance criteria comprise a position quality metric corresponding to a measurement of a satellite signal by the second frequency band receive chain.

Clause 8. The mobile device of clause 1, wherein the controller is further configured to control the first duty cycle independently of the second duty cycle.

Clause 9. The mobile device of clause 8, wherein the controller is further configured to control the second duty cycle to have a longer on time than the first duty cycle.

Clause 10. The mobile device of clause 1, wherein the controller is further configured to turn off the second frequency band receive chain based on fewer than a threshold number of satellite signal measurements, by the second frequency band receive chain and each corresponding to a different satellite, meeting a threshold measurement metric value.

Clause 11. The mobile device of clause 1, further comprising a battery coupled to the first frequency band receive chain and the second frequency band receive chain, and wherein the controller is further configured to turn off the second frequency band receive chain based on at least one of an energy storage level of the battery being below a threshold energy storage level, detection of a spoofed satellite signal in the second frequency band, or detection of jamming in the second frequency band.

Clause 12. An apparatus control method comprising:
controlling a first frequency band receive chain, of an apparatus, to alternate being on and off with a first duty cycle, the first frequency band receive chain being configured to measure satellite signals within a first frequency band;
determining one or more performance criteria; and
controlling, based on the one or more performance criteria, a second frequency band receive chain, of the apparatus, to alternate being on and off with a second duty cycle, the second frequency band receive chain being configured to measure satellite signals within a second frequency band.

Clause 13. The apparatus control method of clause 12, wherein the one or more performance criteria comprise a satellite signal measurement quality metric.

Clause 14. The apparatus control method of clause 13, wherein controlling the second frequency band receive chain comprises increasing the second duty cycle in response to the second frequency band receive chain measuring fewer than a threshold quantity of satellite signals, each corresponding to a different satellite, that each have a value of the satellite signal measurement quality metric of at least a threshold value.

Clause 15. The apparatus control method of clause 13, wherein the satellite signal measurement quality metric comprises a difference between a measurement, by the second frequency band receive chain, of a satellite signal and a predicted measurement of the satellite signal.

Clause 16. The apparatus control method of clause 13, wherein the satellite signal measurement quality metric comprises a difference between a first measurement, of a first satellite signal by the first frequency band receive chain, and a second measurement of a second satellite signal by the second frequency band receive chain.

Clause 17. The apparatus control method of clause 13, wherein the satellite signal measurement quality metric comprises a carrier-to-noise-density ratio.

Clause 18. The apparatus control method of clause 12, wherein the one or more performance criteria comprise a position quality metric corresponding to a measurement of a satellite signal by the second frequency band receive chain.

Clause 19. The apparatus control method of clause 12, wherein the first duty cycle is controlled independently of the second duty cycle.

Clause 20. The apparatus control method of clause 19, wherein the second duty cycle is controlled to have a longer on time than the first duty cycle.

Clause 21. The apparatus control method of clause 12, further comprising turning off the second frequency band receive chain based on fewer than a threshold number of satellite signal measurements, by the second frequency band receive chain and each corresponding to a different satellite, meeting a threshold measurement metric value.

Clause 22. The apparatus control method of clause 12, further comprising turning off the second frequency band receive chain based on at least one of an energy storage level of a battery of the apparatus being below a threshold energy storage level, detection of a spoofed satellite signal in the second frequency band, or detection of jamming in the second frequency band.

Clause 23. A mobile device comprising:
means for measuring satellite signals within a first frequency band;
means for measuring satellite signals within a second frequency band;

means for controlling the means for measuring satellite signals within the first frequency band to alternate being on and off with a first duty cycle;

means for determining one or more performance criteria; and means for controlling, based on the one or more performance criteria, the means for measuring satellite signals within the second frequency band to alternate being on and off with a second duty cycle.

Clause 24. The mobile device of clause 23, wherein the one or more performance criteria comprise a satellite signal measurement quality metric.

Clause 25. The mobile device of clause 24, wherein the means for controlling the means for measuring satellite signals within the second frequency band comprise means for increasing the second duty cycle in response to the means for measuring satellite signals within the second frequency band measuring fewer than a threshold quantity of satellite signals, each corresponding to a different satellite, that each have a value of the satellite signal measurement quality metric of at least a threshold value.

Clause 26. The mobile device of clause 24, wherein the satellite signal measurement quality metric comprises a difference between a measurement, by the means for measuring satellite signals within the second frequency band, of a satellite signal and a predicted measurement of the satellite signal.

Clause 27. The mobile device of clause 24, wherein the satellite signal measurement quality metric comprises a difference between a measurement, of a first satellite signal by the means for measuring satellite signals within the first frequency band, and a second measurement of a second satellite signal by the means for measuring satellite signals within the second frequency band.

Clause 28. The mobile device of clause 24, wherein the satellite signal measurement quality metric comprises a carrier-to-noise-density ratio.

Clause 29. The mobile device of clause 23, wherein the one or more performance criteria comprise a position quality metric corresponding to a measurement of a satellite signal by the means for measuring satellite signals within the second frequency band.

Clause 30. The mobile device of clause 23, wherein a combination of the means for controlling the means for measuring the satellite signals within the first frequency band and the means for controlling the means for measuring satellite signals within the second frequency band comprise means for controlling the first duty cycle independently of the second duty cycle.

Clause 31. The mobile device of clause 30, wherein means for controlling the first duty cycle independently of the second duty cycle comprise means for controlling the second duty cycle to have a longer on time than the first duty cycle.

Clause 32. The mobile device of clause 23, wherein the means for controlling the means for measuring satellite signals within the second frequency band comprise means for turning off the means for measuring satellite signals within the second frequency band based on fewer than a threshold number of satellite signal measurements, by the means for measuring satellite signals within the second frequency band and each corresponding to a different satellite, meeting a threshold measurement metric value.

Clause 33. The mobile device of clause 23, wherein the means for controlling the means for measuring satellite signals within the second frequency band comprise means for turning off the means for measuring satellite signals within the second frequency band based on at least one of an energy storage level of a battery of the mobile device being below a threshold energy storage level, detection of a spoofed satellite signal in the second frequency band, or detection of jamming in the second frequency band.

Clause 34. A non-transitory, processor-readable storage medium comprising processor-readable instructions to cause a processor of a mobile device to:

control a first frequency band receive chain, of the mobile device, to alternate being on and off with a first duty cycle, the first frequency band receive chain being configured to measure satellite signals within a first frequency band;

determine one or more performance criteria; and control, based on the one or more performance criteria, a second frequency band receive chain, of the mobile device, to alternate being on and off with a second duty cycle, the second frequency band receive chain being configured to measure satellite signals within a second frequency band.

Clause 35. The storage medium of clause 34, wherein the one or more performance criteria comprise a satellite signal measurement quality metric.

Clause 36. The storage medium of clause 35, wherein the processor-readable instructions to cause the processor to control the second frequency band receive chain comprise processor-readable instructions to cause the processor to increase the second duty cycle in response to the second frequency band receive chain measuring fewer than a threshold quantity of satellite signals, each corresponding to a different satellite, that each have a value of the satellite signal measurement quality metric of at least a threshold value.

Clause 37. The storage medium of clause 35, wherein the satellite signal measurement quality metric comprises a difference between a measurement, by the second frequency band receive chain, of a satellite signal and a predicted measurement of the satellite signal.

Clause 38. The storage medium of clause 35, wherein the satellite signal measurement quality metric comprises a difference between a first measurement, of a first satellite signal by the first frequency band receive chain, and a second measurement of a second satellite signal by the second frequency band receive chain.

Clause 39. The storage medium of clause 35, wherein the satellite signal measurement quality metric comprises a carrier-to-noise-density ratio.

Clause 40. The storage medium of clause 34, wherein the one or more performance criteria comprise a position quality metric corresponding to a measurement of a satellite signal by the second frequency band receive chain.

Clause 41. The storage medium of clause 34, wherein the processor-readable instructions to cause the processor to control the first frequency band receive chain and the second frequency band receive chain comprise processor-readable instructions to cause the processor to control the first duty cycle independently of the second duty cycle.

Clause 42. The storage medium of clause 41, wherein processor-readable instructions to cause the processor to control the first duty cycle independently of the second duty cycle comprise processor-readable instructions to cause the processor to control the second duty cycle to have a longer on time than the first duty cycle.

Clause 43. The storage medium of clause 34, further comprising processor-readable instructions to cause the processor to turn off the second frequency band receive chain based on fewer than a threshold number of satellite signal measurements, by the second frequency band receive chain and each corresponding to a different satellite, meeting a threshold measurement metric value.

Clause 44. The storage medium of clause 34, wherein the processor-readable instructions to cause the processor to control the second frequency band receive chain comprise processor-readable instructions to cause the processor to turn off the second frequency band receive chain based on at least one of an energy storage level of a battery of the mobile device being below a threshold energy storage level, detection of a spoofed satellite signal in the second frequency band, or detection of jamming in the second frequency band.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A mobile device comprising:
a memory;
a satellite positioning system receiver comprising:
   a first frequency band receive chain configured to measure satellite signals within a first frequency band; and
   a second frequency band receive chain configured to measure satellite signals within a second frequency band; and
a controller, communicatively coupled to the memory and the satellite positioning system receiver, configured to:
   control the first frequency band receive chain to alternate being on and off with a first duty cycle;
   control the second frequency band receive chain, based on one or more performance criteria, to alternate being on and off with a second duty cycle; and
   control the first duty cycle independently of the second duty cycle.

2. The mobile device of claim 1, wherein the one or more performance criteria comprise a satellite signal measurement quality metric.

3. The mobile device of claim 2, wherein the controller is configured to control the second frequency band receive chain to increase the second duty cycle in response to the second frequency band receive chain measuring fewer than a threshold quantity of satellite signals, each corresponding to a different satellite, that each have a value of the satellite signal measurement quality metric of at least a threshold value.

4. The mobile device of claim 2, wherein the satellite signal measurement quality metric comprises a difference between a measurement, by the second frequency band receive chain, of a satellite signal and a predicted measurement of the satellite signal.

5. The mobile device of claim 2, wherein the satellite signal measurement quality metric comprises a difference between a first measurement, of a first satellite signal by the first frequency band receive chain, and a second measurement of a second satellite signal by the second frequency band receive chain.

6. The mobile device of claim 2, wherein the satellite signal measurement quality metric comprises a carrier-to-noise-density ratio.

7. The mobile device of claim 1, wherein the one or more performance criteria comprise a position quality metric corresponding to a measurement of a satellite signal by the second frequency band receive chain.

8. The mobile device of claim 1, wherein the controller is further configured to control the second duty cycle to have a longer on time than the first duty cycle.

9. The mobile device of claim 1, wherein the controller is further configured to turn off the second frequency band receive chain based on fewer than a threshold number of satellite signal measurements, by the second frequency band receive chain and each corresponding to a different satellite, meeting a threshold measurement metric value.

10. The mobile device of claim 1, further comprising a battery coupled to the first frequency band receive chain and the second frequency band receive chain, and wherein the controller is further configured to turn off the second frequency band receive chain based on at least one of an energy storage level of the battery being below a threshold energy storage level, detection of a spoofed satellite signal in the second frequency band, or detection of jamming in the second frequency band.

11. An apparatus control method comprising:
controlling a first frequency band receive chain, of an apparatus, to alternate being on and off with a first duty cycle, the first frequency band receive chain being configured to measure satellite signals within a first frequency band;
determining one or more performance criteria; and
controlling, based on the one or more performance criteria, a second frequency band receive chain, of the apparatus, to alternate being on and off with a second duty cycle, the second frequency band receive chain being configured to measure satellite signals within a second frequency band, wherein the first duty cycle is controlled independently of the second duty cycle.

12. The apparatus control method of claim 11, wherein the one or more performance criteria comprise a satellite signal measurement quality metric.

13. The apparatus control method of claim 12, wherein controlling the second frequency band receive chain comprises increasing the second duty cycle in response to the second frequency band receive chain measuring fewer than a threshold quantity of satellite signals, each corresponding to a different satellite, that each have a value of the satellite signal measurement quality metric of at least a threshold value.

14. The apparatus control method of claim 12, wherein the satellite signal measurement quality metric comprises a difference between a measurement, by the second frequency band receive chain, of a satellite signal and a predicted measurement of the satellite signal.

15. The apparatus control method of claim 12, wherein the satellite signal measurement quality metric comprises a difference between a first measurement, of a first satellite signal by the first frequency band receive chain, and a second measurement of a second satellite signal by the second frequency band receive chain.

16. The apparatus control method of claim 12, wherein the satellite signal measurement quality metric comprises a carrier-to-noise-density ratio.

17. The apparatus control method of claim 11, wherein the one or more performance criteria comprise a position quality metric corresponding to a measurement of a satellite signal by the second frequency band receive chain.

18. The apparatus control method of claim 11, wherein the second duty cycle is controlled to have a longer on time than the first duty cycle.

19. The apparatus control method of claim 11, further comprising turning off the second frequency band receive chain based on fewer than a threshold number of satellite signal measurements, by the second frequency band receive chain and each corresponding to a different satellite, meeting a threshold measurement metric value.

20. The apparatus control method of claim 11, further comprising turning off the second frequency band receive chain based on at least one of an energy storage level of a battery of the apparatus being below a threshold energy storage level, detection of a spoofed satellite signal in the second frequency band, or detection of jamming in the second frequency band.

21. A mobile device comprising:
means for measuring satellite signals within a first frequency band;
means for measuring satellite signals within a second frequency band;
means for controlling the means for measuring satellite signals within the first frequency band to alternate being on and off with a first duty cycle;
means for determining one or more performance criteria; and
means for controlling, based on the one or more performance criteria, the means for measuring satellite signals within the second frequency band to alternate being on and off with a second duty cycle,
wherein a combination of the means for controlling the means for measuring the satellite signals within the first frequency band and the means for controlling the means for measuring satellite signals within the second frequency band comprise means for controlling the first duty cycle independently of the second duty cycle.

22. The mobile device of claim 21, wherein the one or more performance criteria comprise a satellite signal measurement quality metric.

23. The mobile device of claim 22, wherein the means for controlling the means for measuring satellite signals within the second frequency band comprise means for increasing the second duty cycle in response to the means for measuring satellite signals within the second frequency band measuring fewer than a threshold quantity of satellite signals, each corresponding to a different satellite, that each have a value of the satellite signal measurement quality metric of at least a threshold value.

24. The mobile device of claim 22, wherein the satellite signal measurement quality metric comprises a difference between a measurement, by the means for measuring satellite signals within the second frequency band, of a satellite signal and a predicted measurement of the satellite signal.

25. The mobile device of claim 22, wherein the satellite signal measurement quality metric comprises a difference between a measurement, of a first satellite signal by the means for measuring satellite signals within the first frequency band, and a second measurement of a second satellite signal by the means for measuring satellite signals within the second frequency band.

26. The mobile device of claim 21, wherein the means for controlling the means for measuring satellite signals within the second frequency band comprise means for turning off the means for measuring satellite signals within the second frequency band based on fewer than a threshold number of satellite signal measurements, by the means for measuring satellite signals within the second frequency band and each corresponding to a different satellite, meeting a threshold measurement metric value.

27. A non-transitory, processor-readable storage medium comprising processor-readable instructions to cause a processor of a mobile device to:
control a first frequency band receive chain, of the mobile device, to alternate being on and off with a first duty cycle, the first frequency band receive chain being configured to measure satellite signals within a first frequency band;
determine one or more performance criteria;
control, based on the one or more performance criteria, a second frequency band receive chain, of the mobile device, to alternate being on and off with a second duty cycle, the second frequency band receive chain being configured to measure satellite signals within a second frequency band; and
control the first duty cycle independently of the second duty cycle.

* * * * *